(12) United States Patent
Viswanadha (10) Patent No.: US 10,552,415 B2
(45) Date of Patent: Feb. 4, 2020

(54) EFFICIENT DISTRIBUTED JOINING OF TWO LARGE DATA SETS

(71) Applicant: Microsoft Technology Licensing, LLC, Redmond, WA (US)

(72) Inventor: Sreenivasa R. Viswanadha, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 282 days.

(21) Appl. No.: 15/474,955

(22) Filed: Mar. 30, 2017

(65) Prior Publication Data

US 2018/0285420 A1 Oct. 4, 2018

(51) Int. Cl.
*G06F 16/00* (2019.01)
*G06F 16/2453* (2019.01)
*G06F 16/242* (2019.01)
*G06F 16/28* (2019.01)
*G06F 16/2455* (2019.01)

(52) U.S. Cl.
CPC ...... *G06F 16/24544* (2019.01); *G06F 16/244* (2019.01); *G06F 16/24556* (2019.01); *G06F 16/283* (2019.01)

(58) Field of Classification Search
CPC ......... G06F 16/24544; G06F 16/24556; G06F 16/244; G06F 16/283
USPC ........................................................ 707/714
See application file for complete search history.

(56) References Cited

U.S. PATENT DOCUMENTS

| | | | |
|---|---|---|---|
| 7,099,887 B2 | 8/2006 | Hoth et al. | |
| 7,941,424 B2* | 5/2011 | Xu | G06F 16/2456 707/714 |
| 8,200,657 B2 | 6/2012 | Purcell et al. | |
| 9,141,666 B2 | 9/2015 | Shao et al. | |
| 2007/0061287 A1 | 3/2007 | Le et al. | |
| 2011/0184854 A1 | 7/2011 | Beck et al. | |
| 2013/0124501 A1* | 5/2013 | Xu | G06F 16/2456 707/714 |
| 2013/0311445 A1* | 11/2013 | Narita | G06F 16/90344 707/714 |
| 2014/0101213 A1* | 4/2014 | Ueda | G06F 16/182 707/827 |

(Continued)

OTHER PUBLICATIONS

"Example: Joins with a Junction Table", http://support.sas.com/documentation/cdl/en/vaug/67270/HTML/default/viewer.htm, Retrieved on: Feb. 8, 2017, 2 pages.

(Continued)

*Primary Examiner* — Hanh B Thai
(74) *Attorney, Agent, or Firm* — Workman Nydegger (57) ABSTRACT

A distributed join is performed with two large data sets that are shuffled on different keys without shuffling the larger data set, even when the distributed join is performed on the key of the smaller data set. A third data set is generated that is shuffled on the key of the smaller data set and includes data associated with the key of the larger data set. The third data set and the smaller data set are joined on the shuffle key of the smaller data set to create a fourth data set that includes the first and second key. The fourth data set is shuffled on the key of the larger data set. The fourth data set and the larger data set are joined on the key of the larger data set to generate a fifth data set that can be shuffled on the key of the smaller data set.

20 Claims, 7 Drawing Sheets

(56) References Cited

U.S. PATENT DOCUMENTS

| | | | | |
|---|---|---|---|---|
| 2015/0149498 A1* | 5/2015 | Agarwal | ........... | G06F 16/24532 |
| | | | | 707/765 |
| 2015/0234895 A1* | 8/2015 | Erdogan | ........... | G06F 16/24542 |
| | | | | 707/714 |
| 2015/0261804 A1* | 9/2015 | Vemuri | ..................... | G06F 7/36 |
| | | | | 707/744 |
| 2015/0370433 A1* | 12/2015 | Lam | ..................... | G06F 17/246 |
| | | | | 715/771 |
| 2016/0253402 A1* | 9/2016 | Klots | .................... | G06F 16/278 |
| | | | | 707/634 |
| 2016/0259838 A1 | 9/2016 | Banerjee et al. | | |
| 2016/0313874 A1* | 10/2016 | Mikheev | ................. | G06F 16/26 |
| 2016/0350369 A1 | 12/2016 | He et al. | | |
| 2017/0031988 A1* | 2/2017 | Sun | .................. | G06F 16/24554 |
| 2017/0185648 A1* | 6/2017 | Kavulya | ........... | G06F 16/24545 |
| 2018/0173762 A1* | 6/2018 | Hu | .................... | G06F 16/24544 |
| 2018/0365292 A1* | 12/2018 | Sivathanu | ........... | G06F 12/0802 |

OTHER PUBLICATIONS

Azriel, et al., "Working with Logical Tables, Joins, and Columns", http://docs.oracle.com/cd/E15586_01/fusionapps.1111/e20836/busmodlayer.htm, Published on: Aug. 2011, 19 pages.

Sharuvijay, "Bridge Table", http://www.geekinterview.com/question_details/72716, Published on: Jan. 28, 2009, 8 pages.

* cited by examiner

| Part No. | List Price | Date | Supplier |
|---|---|---|---|
| 1 | 60 | 7/1/2016 | Supplier1 |
| 2 | 60 | 7/2/2016 | Supplier2 |
| 3 | 105 | 7/3/2016 | Supplier3 |
| 4 | 50 | 7/4/2016 | Supplier4 |
| 5 | 18 | 7/5/2016 | Supplier5 |
| 6 | 10 | 7/6/2016 | Supplier6 |
| 7 | 15 | 7/7/2016 | Supplier7 |
| 8 | 300 | 7/8/2016 | Supplier8 |
| 9 | 20 | 7/9/2016 | Supplier9 |
| 10 | 12 | 7/10/2016 | Supplier10 |
| 11 | 25 | 7/11/2016 | Supplier11 |
| 12 | 55 | 7/12/2016 | Supplier12 |
| 13 | 45 | 7/13/2016 | Supplier13 |
| 14 | 60 | 7/14/2016 | Supplier14 |
| 15 | 15 | 7/15/2016 | Supplier15 |
| 16 | 25 | 7/16/2016 | Supplier16 |

| Part No. | List Price | Date | Supplier |
|---|---|---|---|
| 101 | 55 | 8/1/2016 | Supplier101 |
| 102 | 20 | 8/2/2016 | Supplier102 |
| 103 | 30 | 8/3/2016 | Supplier103 |
| 104 | 105 | 8/4/2016 | Supplier104 |
| 105 | 40 | 8/5/2016 | Supplier105 |
| 106 | 45 | 8/6/2016 | Supplier106 |
| 107 | 55 | 8/7/2016 | Supplier107 |
| 108 | 150 | 8/8/2016 | Supplier108 |
| 109 | 130 | 8/9/2016 | Supplier109 |
| 110 | 60 | 8/10/2016 | Supplier110 |
| 111 | 25 | 8/11/2016 | Supplier111 |
| 112 | 20 | 8/12/2016 | Supplier112 |
| 113 | 30 | 8/13/2016 | Supplier113 |
| 114 | 40 | 8/14/2016 | Supplier114 |
| 115 | 45 | 8/15/2016 | Supplier115 |
| 116 | 55 | 8/16/2016 | Supplier116 |

| Order No. | Shipdate | Part No. | Sale Price | Supplier | Customer |
|---|---|---|---|---|---|
| 1 | 9/14/2016 | 112 | 15 | Supplier112 | Customer1 |
| 2 | 10/5/2016 | 43, 34 | 100, 200 | Supplier43, Supplier34 | Customer131 |
| 3 | 11/12/2016 | 15, 46, 78 | 12, 45, 54 | Supplier15, Supplier46, Supplier78 | Customer54 |
| 4 | 12/15/2016 | 23 | 100 | Supplier23 | Customer1242 |
| 5 | 12/20/2016 | 134 | 42 | Supplier134 | Customer1654 |
| 6 | 12/21/2016 | 65, 75 | 62, 43 | Supplier65, Supplier75 | Customer894 |
| 7 | 12/23/2016 | 84 | 421 | Supplier84 | Customer43 |
| 8 | 1/2/2017 | 24 | 53 | Supplier24 | Customer63 |
| 9 | 1/2/2017 | 54 | 132 | Supplier54 | Customer432 |
| 10 | 1/5/2017 | 23, 54 | 101, 130 | Supplier23, Supplier54 | Customer654 |
| 11 | 1/5/2017 | 1, 8 | 55, 294 | Supplier1, Supplier8 | Customer765 |
| 12 | 1/23/2017 | 64 | 245 | Supplier64 | Customer897 |
| 13 | 2/5/2017 | 79 | 250 | Supplier79 | Customer654 |
| 14 | 2/8/2017 | 65 | 65 | Supplier65 | Customer7654 |
| 15 | 2/27/2017 | 51, 89, 93 | 54, 35, 132 | Supplier51, Supplier89, Supplier93 | Customer1234 |
| 16 | 3/1/2017 | 108, 109 | 125, 125 | Supplier108, Supplier109 | Customer9234 |

| Order No. | Shipdate | Part No. | Sale Price | Supplier | Customer |
|---|---|---|---|---|---|
| 101 | 3/1/2017 | 1, 10, 23 | 55, 10, 101 | Supplier1, Supplier10, Supplier23 | Customer12 |
| 102 | 3/2/2017 | 32 | 132 | Supplier32 | Customer13 |
| 103 | 3/3/2017 | 51, 53, 101 | 55, 12, 50 | Supplier51, Supplier53, Supplier101 | Customer5 |
| 104 | 3/4/2017 | 34, 8 | 205, 294 | Supplier34, Supplier8 | Customer124 |
| 105 | 3/5/2017 | 13, 18 | 42, 45 | Supplier13, Supplier18 | Customer165 |
| 106 | 3/6/2017 | 65, 3 | 60, 100 | Supplier65, Supplier3 | Customer89 |
| 107 | 3/7/2017 | 83, 84 | 42, 420 | Supplier83, Supplier84 | Customer4 |
| 108 | 3/8/2017 | 24, 53, 92 | 53, 10, 100 | Supplier24, Supplier53, Supplier92 | Customer6 |
| 109 | 3/9/2017 | 54 | 130 | Supplier54 | Customer43 |
| 110 | 3/10/2017 | 23 | 101 | Supplier23 | Customer65 |
| 111 | 3/11/2017 | 2, 5, 104 | 55, 15, 100 | Supplier2, Supplier5, Supplier104 | Customer76 |
| 112 | 3/12/2017 | 52 | 200 | Supplier52 | Customer89 |
| 113 | 3/13/2017 | 73 | 250 | Supplier73 | Customer65 |
| 114 | 3/14/2017 | 42, 31 | 23, 45 | Supplier42, Supplier31 | Customer765 |
| 115 | 3/15/2017 | 73, 90 | 251, 100 | Supplier73, Supplier90 | Customer123 |
| 116 | 3/16/2017 | 108 | 125 | Supplier108 | Customer923 |

| Part No. | Order No. |
|---|---|
| 1 | 11, 101 |
| 2 | 111 |
| 3 | 106 |
| 4 | 25 |
| 5 | 111 |
| 6 | 45 |
| 7 | 65 |
| 8 | 11, 104 |
| 9 | 78 |
| 10 | 101 |
| 11 | 89 |
| 12 | 156 |
| 13 | 105 |
| 14 | 189 |
| 15 | 175 |
| 16 | 134 |

| Part No. | Order No. |
|---|---|
| 101 | 103 |
| 102 | 123 |
| 103 | 164 |
| 104 | 111 |
| 105 | 145 |
| 106 | 68 |
| 107 | 46 |
| 108 | 16, 116 |
| 109 | 16 |
| 110 | 74 |
| 111 | 67 |
| 112 | 1 |
| 113 | 47 |
| 114 | 183 |
| 115 | 165 |
| 116 | 155 |

| Order No. | Part No. | List Price |
|---|---|---|
| 1 | 112 | 20 |
| 2 | 43, 34 | 110, 210 |
| 3 | 15, 46, 78 | 15, 50, 60 |
| 4 | 23 | 105 |
| 5 | 134 | 45 |
| 6 | 65, 75 | 70, 50 |
| 7 | 84 | 430 |
| 8 | 24 | 55 |
| 9 | 54 | 135 |
| 10 | 23, 54 | 105, 135 |
| 11 | 1, 8 | 60, 300 |
| 12 | 64 | 250 |
| 13 | 79 | 250 |
| 14 | 65 | 70 |
| 15 | 51, 89, 93 | 60, 40, 135 |
| 16 | 108, 109 | 150, 130 |

| Order No. | Part No. | List Price |
|---|---|---|
| 101 | 1, 10, 23 | 60, 12, 105 |
| 102 | 32 | 40 |
| 103 | 51, 53, 101 | 60, 15, 50 |
| 104 | 34, 8 | 210, 300 |
| 105 | 13, 18 | 45, 50 |
| 106 | 65, 3 | 70, 105 |
| 107 | 83, 84 | 45, 430 |
| 108 | 24, 53, 92 | 55, 10, 100 |
| 109 | 54 | 135 |
| 110 | 23 | 105 |
| 111 | 2, 5, 104 | 60, 18, 105 |
| 112 | 52 | 200 |
| 113 | 73 | 255 |
| 114 | 42, 31 | 25, 45 |
| 115 | 73, 90 | 255, 100 |
| 116 | 108 | 150 |

| Order No. | Part No. | List Price | Sale Price |
|---|---|---|---|
| 1 | 112 | 20 | 15 |
| 2 | 43, 34 | 110, 210 | 100, 200 |
| 3 | 15, 46, 78 | 15, 50, 60 | 12, 45, 54 |
| 4 | 23 | 105 | 100 |
| 5 | 134 | 45 | 42 |
| 6 | 65, 75 | 70, 50 | 62, 43 |
| 7 | 84 | 430 | 421 |
| 8 | 24 | 55 | 53 |
| 9 | 54 | 135 | 132 |
| 10 | 23, 54 | 105, 135 | 101, 130 |
| 11 | 1, 8 | 60, 300 | 55, 294 |
| 12 | 64 | 250 | 245 |
| 13 | 79 | 250 | 250 |
| 14 | 65 | 70 | 65 |
| 15 | 51, 89, 93 | 60, 40, 135 | 54, 35, 132 |
| 16 | 108, 109 | 150, 130 | 125, 125 |

| Order No. | Part No. | List Price | Sale Price |
|---|---|---|---|
| 101 | 1, 10, 23 | 60, 12, 105 | 55, 10, 101 |
| 102 | 32 | 40 | 132 |
| 103 | 51, 53, 101 | 60, 15, 50 | 55, 12, 50 |
| 104 | 34, 8 | 210, 300 | 205, 294 |
| 105 | 13, 18 | 45, 50 | 42, 45 |
| 106 | 65, 3 | 70, 105 | 60, 100 |
| 107 | 83, 84 | 45, 430 | 42, 420 |
| 108 | 24, 53, 92 | 55, 10, 100 | 53, 10, 100 |
| 109 | 54 | 135 | 130 |
| 110 | 23 | 105 | 101 |
| 111 | 2, 5, 104 | 60, 18, 105 | 55, 15, 100 |
| 112 | 52 | 200 | 200 |
| 113 | 73 | 255 | 250 |
| 114 | 42, 31 | 25, 45 | 23, 45 |
| 115 | 73, 90 | 255, 100 | 251, 100 |
| 116 | 108 | 150 | 125 |

| Part No. | Avg. Price Differential |
|---|---|
| 1 | 5 |
| 2 | 5 |
| 3 | 5 |
| 4 | 0 |
| 5 | 3 |
| 6 | 10 |
| 7 | 6 |
| 8 | 6 |
| 9 | 10 |
| 10 | 2 |
| 11 | 5 |
| 12 | 4 |
| 13 | 3 |
| 14 | 9 |
| 15 | 3 |
| 16 | 20 |

| Part No. | Avg. Price Differential |
|---|---|
| 101 | 0 |
| 102 | 3 |
| 103 | 2 |
| 104 | 5 |
| 105 | 1 |
| 106 | 5 |
| 107 | 6 |
| 108 | 25 |
| 109 | 5 |
| 110 | 10 |
| 111 | 10 |
| 112 | 5 |
| 113 | 20 |
| 114 | 5 |
| 115 | 7 |
| 116 | 9 |

EFFICIENT DISTRIBUTED JOINING OF TWO LARGE DATA SETS

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. As such, the performance of many computing tasks has become distributed across a number of different computer systems and/or a number of different computer environments.

For instance, data sets (e.g., databases, tables, and so forth) now often include terabytes of data. Accordingly, such data sets are generally stored in distributed fashion across a number of storage systems. Additionally, such large data sets have to be operated upon in similarly distributed fashion across a number of different computer systems. As such, enormous amounts of data relating to such data sets are generated, transferred, and shared each minute of each day. For example, data sets that are as big as 80 terabytes (or larger) may be consistently re-shuffled, or re-organized, based on a different key in response to particular requests. Although such operations may be simple, these same operations may be very expensive as massive amounts of data must be retrieved and operated upon from distributed computer systems. Accordingly, the large and distributed nature of these data sets suffer from numerous problems, including extreme network traffic congestion, resource usage, and execution time associated with any manipulation of these large data sets.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to distributedly joining two data sets. For example, embodiments may include receiving a request to distributedly join a first data set and a second data set on a first key. The first data set may be shuffled on the first key, while the second data set may be shuffled on a second key. Furthermore, the second data set may comprise a data set that is larger than the first data set. Embodiments may further include generating a third data set that is both shuffled on the first key and includes data associated with the second key. Embodiments may also include distributedly joining the first data set and the third data set on the first shuffle key to generate a fourth data set that is shuffled on the first key and includes data associated with both the first key and the second key. The fourth data set may then be shuffled on the second key. The second data set and the fourth data set may then be distributedly joined on the second key to generate a fifth data set that can be used to generate a result for the received request.

In this way, a distributed join of two large data sets that is to be performed on the key of the smaller of the two data sets to be distributedly joined, can be performed without having to re-shuffle the larger data set on the key of the smaller data set. Avoiding re-shuffling of the larger data set may be accomplished by generating a third data set that is shuffled on the key of the smaller data set and includes the key of the larger data set. The third data set is distributedly joined with the smaller data set to create a fourth data set that can be distributedly joined with larger data set. Performing a distributed join in this way can include great improvements in network traffic, time associated with execution of the distributed join, and resource usage, based at least partially on the avoidance of re-shuffling the larger of the two initial data sets.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 5A and 5B illustrate the second exemplary shuffled data set to be distributedly joined with the first exemplary data set.

DETAILED DESCRIPTION

At least some embodiments described herein relate to distributedly joining two data sets. For example, embodiments may include receiving a request that requires the system to distributedly join a first data set and a second data set on a first key. The first data set may be shuffled on the first key, while the second data set may be shuffled on a second key. Furthermore, the second data set may comprise a data set that is larger than the first data set. Embodiments may further include generating a third data set that is both shuffled on the first key and includes data associated with the second key. Embodiments may also include distributedly joining the first data set and the third data set on the first shuffle key to generate a fourth data set that is shuffled on the first key and includes data associated with both the first key and the second key. The fourth data set may then be shuffled on the second key. The second data set and the fourth data set may then be distributedly joined on the second key to generate a fifth data set that can be used to generate a result for the received request.

In this way, a distributed join of two large data sets that is to be performed on the key of the smaller of the two data sets to be distributedly joined, can be performed without having to re-shuffle the larger data set on the key of the smaller data set. Avoiding re-shuffling of the larger data set may be accomplished by generating a third data set that is shuffled on the key of the smaller data set and includes the key of the larger data set. The third data set is distributedly joined with the smaller data set to create a fourth data set that can be distributedly joined with larger data set. Performing a distributed join in this way can include great improvements in network traffic, time associated with execution of the distributed join, and resource usage, based at least partially on the avoidance of re-shuffling the larger of the two initial data sets.

Some introductory discussion of a computing system will be described with respect to FIG. 1. Then performing a distributed join of two large data sets will be described with respect to FIGS. 2 through 9.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
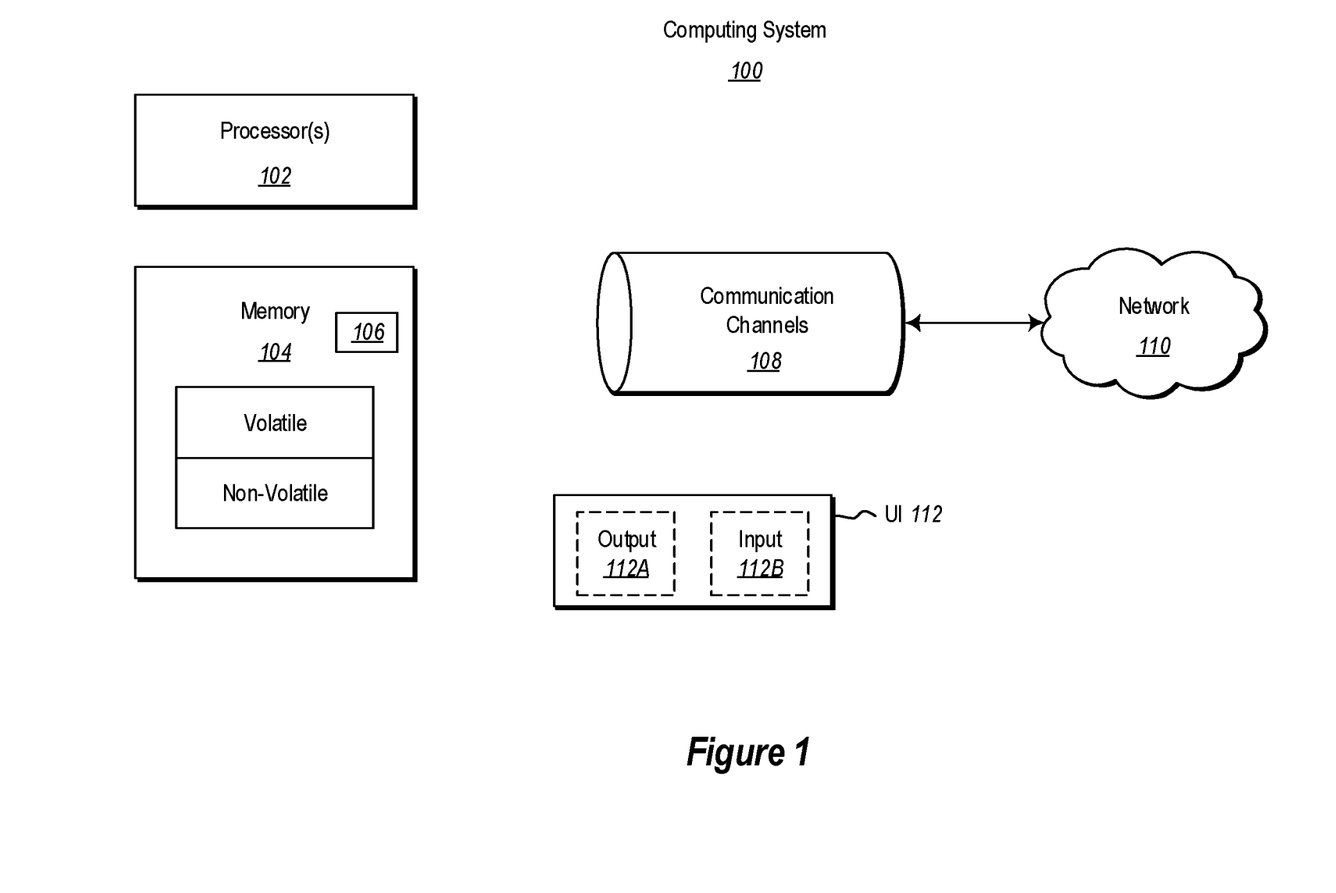
FIG. 1 illustrates an example computer architecture that facilitates operation of the principles described herein.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
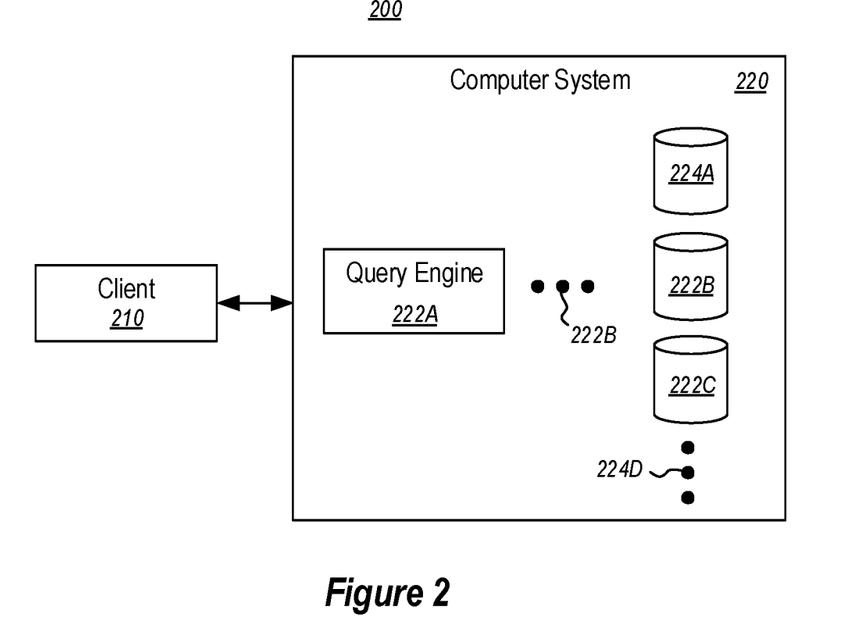
FIG. 2 illustrates an example environment for distributedly joining two data sets.

FIG. 2 illustrates a computer environment 200 for distributedly joining two large shuffled data sets that are each shuffled on different keys, without re-shuffling the largest of the two data sets, as further described herein. As illustrated, the computer environment 200 may include a client computer system 210 and a data set computer system 220. Both the client 210 and the data set computer system may correspond to the computer system 100, as described with respect to FIG. 1. The client computer system 210 may comprise any type of computer system capable of both generating queries to be executed against one or more data sets and receiving results associated with such generated queries. For instance, the client computer system 210 may comprise a laptop computer, desktop computer, smartphone, tablet, and so forth that use any applicable operating system (e.g., MICROSOFT® WINDOWS®, APPLE® MAC® OS, APPLE IOS®, GOOGLE™ CHROME OS™, GOOGLE ANDROID™, and so forth).

The data set computer system 220 may comprise a computer system that includes, or has access to, various data sets 224 (i.e., data set 224A through data set 224D). The data set computer system 220 may further be capable of receiving data set queries and performing all processing associated with building a response, as described herein. While only three data sets 224 are illustrated as part of the data set computer system 220, ellipses 224D represents that any number of databases may be included within the data set computer system 220. In some embodiments, the data sets 224 may comprise relational databases. In such embodiments, the relational databases may be managed using any number of query languages (e.g., SQL) and/or any number of database management systems (e.g., MICROSOFT SQL SERVER®, ORACLE®, MYSQL®, and so forth). In other embodiments, the data sets 224 may comprise other types of data sets, including, but not limited to, NoSQL databases, object databases, object-relational databases, MONGODB®, and so forth.

The data set computer system 220 may further include a query engine 222A. The query engine 222A may comprise any appropriate combination of software and/or hardware that is capable of both receiving queries associated with the data sets 224, as well as performing any applicable operations with respect to such queries and data sets (e.g., building an appropriate response to a particular query). For instance, the query engine may be capable of identifying that a received query relates to distributedly joining two data sets, as well as performing the processes associated with distributedly joining the two data sets, including generating any intermediate data sets. While only one query engine 222A is illustrated, ellipses 222B represents that any number of query engines may be utilized by the data set computer system 220. For instance, each data set 224 may include a separate query engine.

As illustrated, the data set computer system 220 may include various engines, functional blocks, and components, including query engine 222A and data sets 224. The various engines, components, and/or functional blocks of the data set computer system 220 may be implemented on a local computer system or may be implemented on a distributed computer system that includes elements resident in the cloud or that implement aspects of cloud computing. The various engines, functional blocks, and/or components of the data set computer system 220 may be implemented as software, hardware, or a combination of software and hardware.

Notably, the configuration of data set computer system 220 is only for example purposes. As such, the data set computer system 220 may include more or less than the engines, functional blocks, and/or components illustrated in FIG. 2. For instance, the query engine 222A may be further split into other engines that are each particularly responsible for receiving and parsing queries, retrieving data from data sets (e.g., tables, databases, and so forth), building responses to queries, and so forth. Although not illustrated, the various engines of the computer system 220 may access and/or utilize a processor and memory, such as the processor 102 and the memory 104 of FIG. 1, as needed to perform their various functions.

Figure 3:
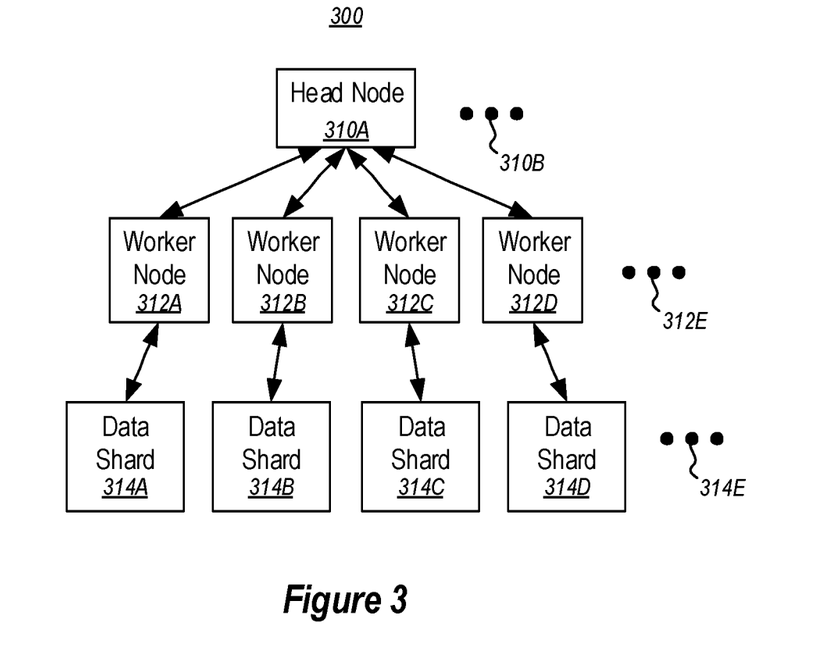
FIG. 3 illustrates another example environment for distributedly joining two data sets.

FIG. 3 illustrates an exemplary distributed data set computer system 300 that comprises a specific example of the data set computer system 220. As illustrated, the distributed data set computer system 300 may include a head node 310A, worker nodes 312 (i.e., worker node 312A through worker node 312E), and data shards 314 (i.e., data shard 314A through data shard 314E). The head node 310 may comprise the computer system 100 or the computer system 200, described with respect to FIG. 1 and FIG. 2, respectively. More specifically, the head node 310 may comprise a computer system that is capable of receiving queries, performing scheduling with respect to which worker nodes are to perform particular tasks associated with responding to a received query, performing tasks associated with responding to a received query (e.g., building a response, retrieving data from a particular data set, presenting a response to a user, and so forth). While only one head node is illustrated, ellipses 310B illustrates that any number of head nodes having any number of corresponding worker nodes and accessible data sets may be used in implementing the principles described herein.

Oftentimes, the head node 310 may receive a query and simply perform scheduling with respect to which worker node 312 is to perform particular operations in response to a received query. As such, each worker node may be configured to identify received queries and perform any applicable processing associated with a received query. Accordingly, the worker nodes 312 may also comprise a computer system such as the computer system 100 of FIG. 1 or the computer system 220 of FIG. 2. In some embodiments, the worker nodes may be responsible for performing any applicable operations (e.g., retrieval of data) with respect to different shuffled shards of data, such that each worker node is responsible for a particular shuffled shard of data. With respect to this disclosure, a shuffled data set comprises a data set that is organized by a particular key that comprises a particular type of data. Shuffled shards of data may comprise particular portions of a shuffled data set, each portion of which is operated upon by a different worker node, as described further herein. Shuffled shards of data may be particularly important (and most-often used) when the data sets being accessed/manipulated are very large (e.g., terabytes of data within a single data set).

For example, a data set of line-items may be shuffled, or organized, based on a key of order numbers. Such a line item data set may also include other data such as the price of a particular order (or a particular part), the date that a purchase was made, the customer that made the purchase, and so forth. Accordingly, in this example, the line item data set may include numerous types of data while being shuffled, or organized, based on order numbers. More particularly, each row of the data set may be organized based on the row's order number (i.e., row 1 is order number 1, row 2 is order number 2, and so forth), and may further include other data associated with each particular order number (e.g., order number 1 may include the purchase of a particular part, the price of the particular part, and so forth).

Accordingly, an example of an embodiment that includes the worker nodes being responsible for performing any applicable operations (e.g., retrieval of data) with respect to different shuffled shards of data, such that each worker node is responsible for a particular shuffled shard of data, is described. In such an example, assume that the line item data set previously described includes 400 order numbers and other applicable data (e.g., parts, price of parts, and so forth) associated with those 400 order numbers. Additionally, assume that there are four worker nodes 312 (e.g., worker node 312A through worker node 312D). Each node 312 may then be responsible for the processing of 100 order numbers. More specifically, worker node 312A may be responsible for all processing (e.g., retrieval/transmission of data, operations performed on the data retrieved, and so forth) of data associated with order numbers 1-100, worker node 312B may be responsible for all processing of data associated with order numbers 101-200, worker node 312C may be responsible for all processing of data associated with order numbers 201-300, and so forth.

In some embodiments, such a line item data set may be stored within one storage system. In such embodiments, each worker node may retrieve and/or process data from the same storage system. In other embodiments, such a line item data set may be distributed across a number of storage systems (i.e., as described in the example above having a line item data set with 400 order numbers). In such embodiments, each worker node may retrieve and/or process data from different storage systems, or at least some worker nodes may retrieve/process data from different storage systems than other worker nodes. Accordingly, such storage systems may comprise any type of storage associated with stored data sets that can be accessed by the head node 310 and/or worker nodes 312 to process the data and build responses to received queries.

Such data sets may further be distributedly joined with other data sets to combine data that is included within each data set (e.g., distributedly joining data sets in SQL), as further described herein. When the data sets are very large (e.g., greater than or equal to 1 terabyte), such distributed joins may be performed in a distributed manner, such that either or both of the following are true: 1. the data sets are stored in a distributed manner (i.e., the data sets are stored across more than one storage system) and 2. the processing that occurs with respect to distributedly joining the data sets is performed in a distributed manner (e.g., the distributed processing of data using the worker nodes 312 as described above with respect to the 400 order numbers of a line item data set). Performing distributed joins of such large data sets may often be performed in a distributed manner (i.e., a distributed join) at least partially because of the processing power that is used to satisfactorily perform such operations.

Figure 4A:
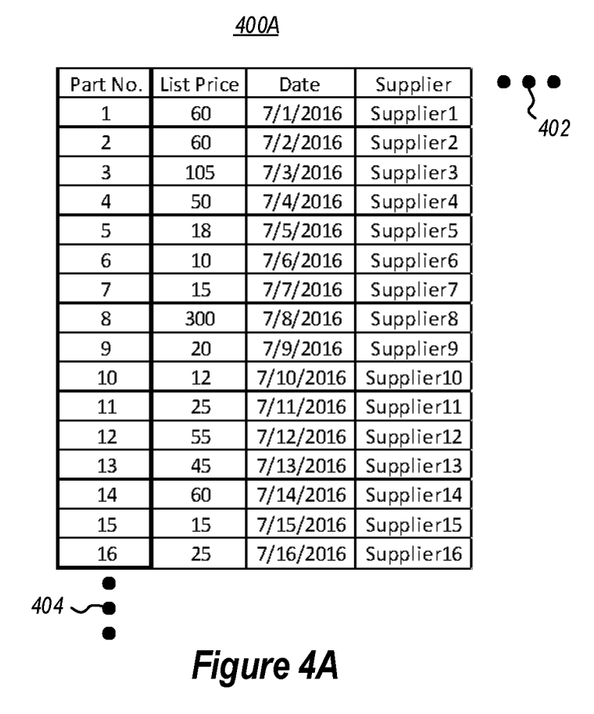
FIGS. 4A and 4B illustrate a first exemplary shuffled data set to be distributedly joined with a second exemplary data set.

FIGS. 4A through 9B are used to describe a particular example of distributedly joining two large shuffled data sets that are each shuffled on different keys without re-shuffling the largest of the two data sets. In this particular example, assume that a query or request has been received at the distributed data set computer system 300 to distributedly join two large data sets that are each shuffled on a different key, as further described herein. Further assume that the received query/request includes a request for an average price differential of the list price of part numbers purchased versus the sale price (i.e., the actual price paid) for those same part numbers. The first data set may be a parts data set that includes parts data shard 400A and parts data shard 400B, as illustrated in FIGS. 4A and 4B, while the second data set may be a line item data set that includes line item data shard 500A and line item data shard 500B, as illustrated in FIGS. 5A and 5B. Assume As shown in FIGS. 4A and 4B, the part data set is shuffled, or organized, based on part number (i.e., part number is the key of this data set). Furthermore, as illustrated by the ellipses 402 and the ellipses 404 of the part data set (i.e., data shard 400A and data shard 400B), there may be any number of additional types of data (e.g., price data, manufacturer data, and so forth) included within the part data set. Similarly, the ellipses 404 and 408 represent that each data shard (e.g., data shard 400A, data shard 400B, data shard 500A, and data shard 500B) in this particular example may include 100 rows of data (i.e., data shard 400A includes part numbers 1-100, data shard 400B includes part numbers 101-200, and so forth). Accordingly, each data shard (i.e., data shard 400A, data shard 400B, and so forth) may each be distributedly operated upon by a different worker node 312. Notably, while only two shards of data are demonstrated with respect to the data sets of the present example, any number of data shards may be used to practice the principles described herein. Accordingly, there may be any number of part numbers and/or order numbers (potentially hundreds of thousands, millions, billions, trillions, and so forth) used to practice the principles described herein. Notably, the principles described herein may be particularly relevant to such large data sets that are necessarily joined in a distributed manner.

As shown in FIGS. 5A and 5B, the line item data set is shuffled, or organized, based on order number (i.e., order number is the key of this data set). As illustrated by ellipses 502 and ellipses 506 included within the line item data set, there may be any number of types of data (e.g., supplier data, customer data, and so forth). Similarly, ellipses 504 and 508 represent that each data shard may include 100 rows of data. While only two shards of data are demonstrated with respect to the line item data set, any number of shards may be included within the line item data set. As such, the line item data set may include any number of order numbers (potentially hundreds of thousands, millions, billions, trillions, and so forth). Notably, each of the two data sets to be distributedly joined may generally include a relatively large amount of data, as described further herein (i.e., a sufficient size for distributedly joining data sets).

While the two data sets used in the present example (and throughout FIGS. 4A through 9B) comprise a parts data set and a line item data set, the principles described herein may be practiced using any type of data sets that include essentially any type of data. Notably, the key features of the data set illustrated in FIGS. 4A and 4B (i.e., the parts data set in the present example) are that the data set is the smaller of the two data sets to be distributedly joined, the data set is still a relatively large data set (generally a terabyte or larger), the data set is shuffled on a different key than the larger data set (e.g., the parts data set is shuffled on part number while the line item data set is shuffled on order number), and the data set does not include the key, or data, on which the larger data set is shuffled (e.g., the parts data set does not include order numbers).

Additionally, the smaller data set (e.g., the parts data set) may also generally include some data that both will be used in a final result and is not included within the larger data set (e.g., the line item data set). For instance, in the present example, such data included in the smaller data set that is not included in the larger set and is to be used in the final data set comprises a list price of parts. On the other hand, the key features of the data set illustrated in FIGS. 5A and 5B (i.e., the line item data set in the present example) are that the data set is the larger of the two data sets (i.e., the line item data set is larger than the parts data set) to be distributedly joined, the data set is a very large data set (potentially more than 50 terabytes of data included within the data set), and the data set includes the key, or data (e.g., part no.) on which the smaller data set (e.g., the parts data set) is shuffled, but is not shuffled on that key.

In the ongoing example, assume that the query received further includes a request for an average price differential of the list price of various part numbers versus the sale price (i.e., the actual price paid) for each of those same parts in addition to distributedly joining the parts data set and the line item data set. Additionally, assume that the request to distributedly join the data sets included a request to join the data sets on the part number key, or in other words, the resulting data set from distributedly joining the parts data set and the line item data set is to be shuffled based on part numbers (i.e., the part number key). Notably, data sets can generally only be distributedly joined when they are shuffled on the same key. As such, when receiving a request to distributedly join two data sets that are each shuffled on different keys, as is the case in the ongoing example, some manipulations of data sets generally occurs behind the scenes (i.e., in a manner that is not visible to the user) in order to eventually distributedly join the two data sets on the same key.

Generally, the data set that is shuffled on the incorrect key (i.e., the data set that is shuffled on a key that is different from the key on which the data sets are being distributedly joined) will be re-shuffled, such that the data set is then shuffled on the correct key. In the ongoing example, the line item data set is shuffled on the incorrect key (i.e., the line item data set is shuffled on the order number key rather than the part number key). As such, previous solutions would include internally (i.e., not visible to a user) re-shuffling the line item data set such that the line item data set is shuffled on the correct key (i.e., the part number key), and then distributedly joining the two data sets on part number key. However, re-shuffling such a large data set (e.g., potentially larger than 50 terabytes) is extremely inefficient. More specifically, re-shuffling a data set of that size may take a lot of time and computing resources based on the magnitude of the data set alone. Additionally, because such a data set is likely to be both stored and operated upon in a distributed manner (i.e., stored across multiple storage systems and operated upon by multiple worker nodes), network bandwidth may also be substantially affected. Accordingly, the principles described herein may be implemented to avoid such inefficiencies that occur because of re-shuffling such large data sets.

Figure 6A:
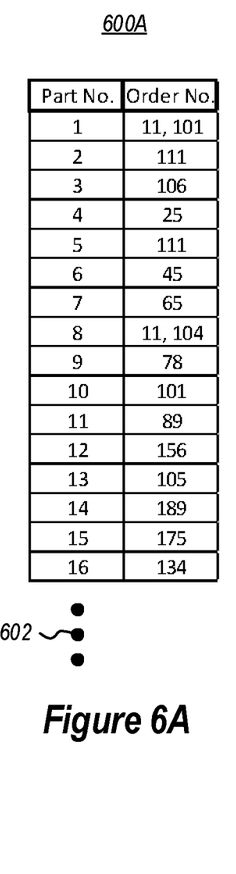
FIGS. 6A and 6B illustrate an exemplary internal shuffled data set that is generated to be distributedly joined with the smaller of the two data sets to be distributedly joined.
Figure 6B:
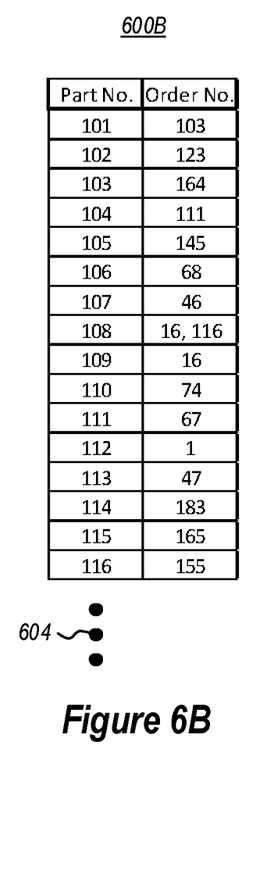

FIGS. 6A and 6B illustrate an internal data set (i.e., a data set that is generated by the distributed data set computer system 300 in a manner that is not visible to a user) that may be generated to avoid re-shuffling the larger data set (e.g., the line item data set 400A), and therefore avoid the inefficiencies associated with re-shuffling such a large data set. The internal data set may comprise a slice of data from the line item data set, and further, may only include data associated with the keys on which each of the data sets to be distributedly joined are shuffled. For instance, in the ongoing example, the line item data set is shuffled on the order number key and the part data set is shuffled on the part number key.

As such, the internal data set includes only order numbers (as included in the line item data set) and part numbers (as included in the parts data set). Notably, as shown, the internal data set is shuffled on the key on which the two data sets are to be distributedly joined (as well as the key of the smaller data set), which in the ongoing example comprises the part number key. However, because the internal data set is a slice of data from the line item data set (i.e., the larger table), the internal data set will not initially be shuffled by the key of the smaller data set (i.e., the part number key in this example). As such, the internal data set, as illustrated in FIGS. 6A and 6B, is shown after the internal data set has been shuffled by the key of the smaller data set (i.e., the part number key). The ellipses 602 and the ellipses 604 represent that there may be any number of part numbers and/or order numbers included within the internal data set, respectively. More particularly, the number of part numbers and/or order numbers may correlate to the number of part numbers within the line item data set.

Figure 7A:
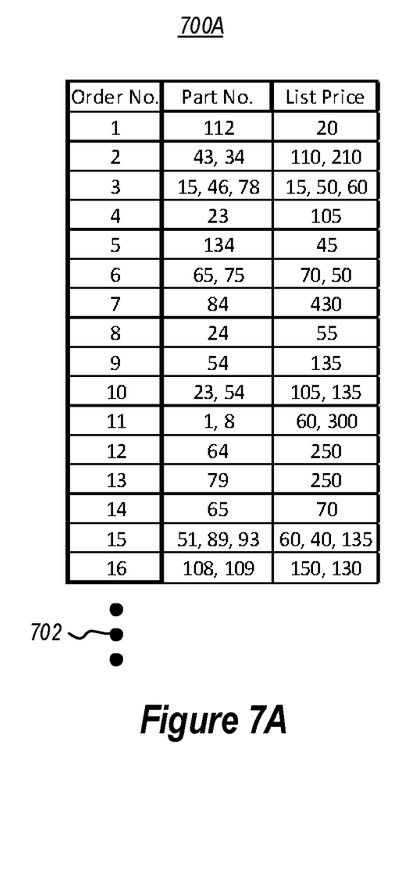
FIGS. 7A and 7B illustrates an exemplary shuffled internal data set that is the result of distributedly joining the smaller of the two data sets to be distributedly joined and the generated internal data set.
Figure 7B:
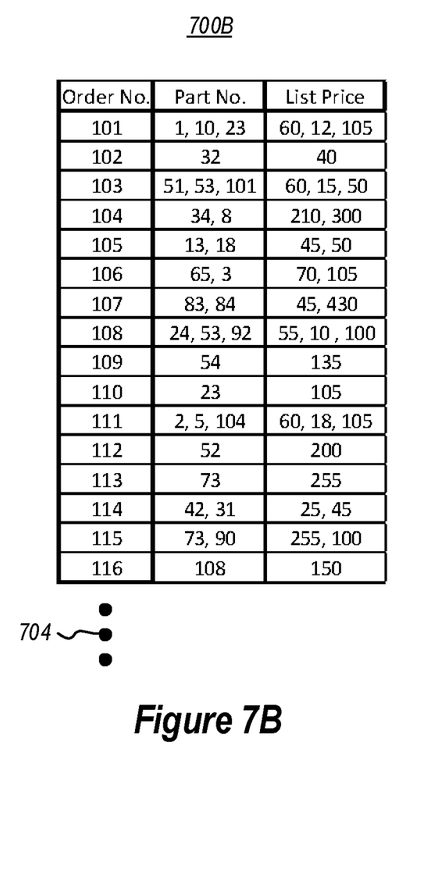

Once the internal data set has been generated, the parts data set may be distributedly joined with the internal data set on the part number key. The distributed joining of the parts data set and the internal data set may further comprise all pertinent data from the parts data set (i.e., part numbers and list prices) and the internal data set (i.e., part numbers and order numbers) to be used to respond to the original query/request, including order numbers, part numbers, and list price in the resulting data set, as illustrated in FIGS. 7A and 7B. As illustrated, the resulting data set may also be re-shuffled on the order number key (i.e., the resulting data set illustrated in FIGS. 7A and 7B is shown after re-shuffling on the order number key has occurred, as the resulting data set will initially be shuffled on the part number key).

Notably, the resulting data set (i.e., the data set of FIGS. 7A and 7B) is much smaller than the line item data set of FIGS. 5A and 5B (i.e., the line item data set may include at least numerous columns more than the resulting table), and is therefore much easier to re-shuffle than the line item data set. Notably, ellipses 702 and ellipses 704 represent that while only 16 order numbers, part numbers, and list prices are shown in each shard (i.e., data shard 700A and data shard 700B), each shard may include 100 order numbers. Additionally, as further described herein, each data set used in the present example is shown as being relatively small for example purposes only. Accordingly, each of these data sets (i.e., the data sets illustrated in FIGS. 4A through 9B) may include terabytes or more of data.

Figure 4B:
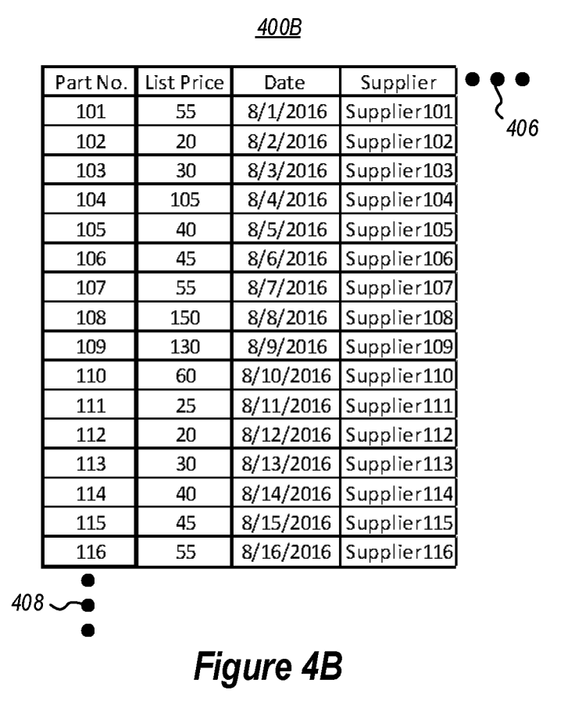

Notably, regardless of the actual size of the resulting data set, the number of order numbers, part numbers, and list prices may correlate to the number of order numbers and part numbers of the internal data set (i.e., the data set of FIGS. 6A and 6B) and the order numbers, part numbers, and list prices of the parts data set (i.e., the data set of FIGS. 4A and 4B). In this way, the order numbers of the line item data set have essentially been injected into the parts data set rather than re-shuffling the line item data set. As such, the resulting data set of FIGS. 7A and 7B may then be distributedly joined with the line item data set 400A.

Figure 8A:
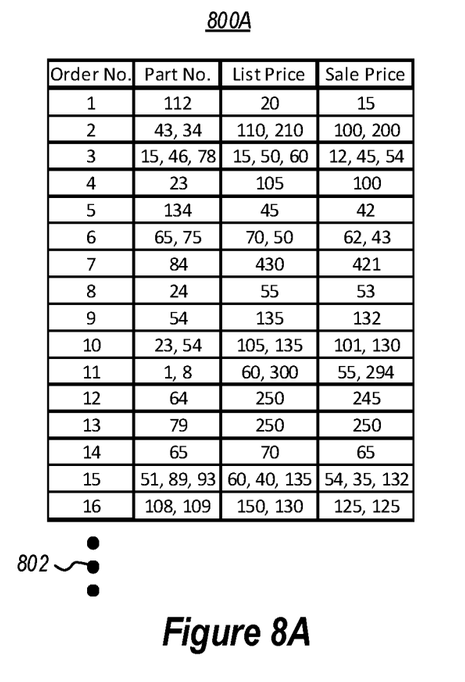
FIGS. 8A and 8B illustrate an exemplary data set that results from distributedly joining the larger of the two data sets with the resulting data set of distributedly joining the smaller of the two data sets with the generated internal data set.
Figure 8B:
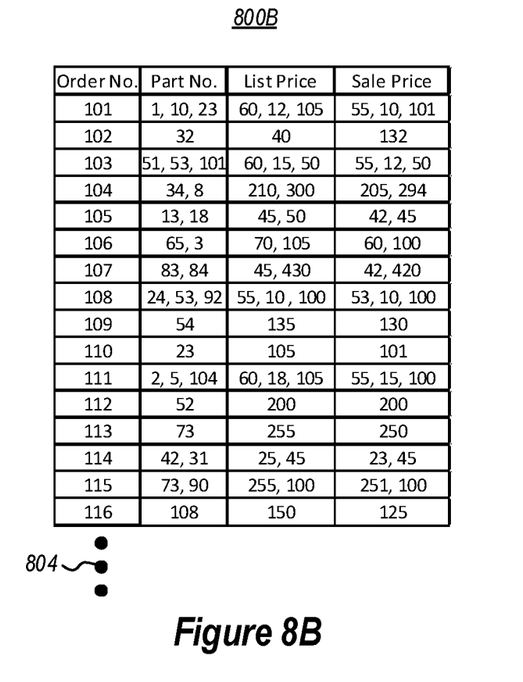

FIGS. 8A and 8B illustrate the final data set (i.e., as shown by data shard 800A and data shard 800B) that results from distributedly joining the line item data set of FIGS. 5A and 5B with the resulting data set of FIGS. 7A and 7B on the order number key, as both the line item data set and the resulting data set are shuffled on the order number key. Additionally, the distributed joining of the line item data set and the resulting data set may comprise all pertinent data from the line item data set and the resulting data set to build a response to the initial query/request, including order numbers, part numbers, list prices, and sales prices, as illustrated in FIGS. 8A and 8B.

Once again, ellipses 802 and ellipses 804 represent that data shard 800A and data shard 800B each include 100 rows (i.e., 100 order numbers, 100 part numbers, and so forth). Furthermore, once again, the number of order numbers, part numbers, list prices, and sale prices correlate to the number of order numbers, part numbers, list prices, and sale prices of the line item data set of FIGS. 5A and 5B and/or the resulting data set of FIGS. 7A and 7B. The final data set of FIGS. 8A and 8B may then be manipulated in accordance with the original request.

In the ongoing example, the received query requested the average price differential of the list price of parts that were purchased versus the actual sale price of parts that were purchased. As such, the final data set, which is again much smaller than the line item data set, can then be shuffled by the part number key, as originally requested, and the sale price of each purchased part number can then be subtracted from the list price of each corresponding purchased part number. Those differences can then be averaged for each part number and made accessible to the user, program, service, and so forth, that made the original request/query.

Figure 9A:
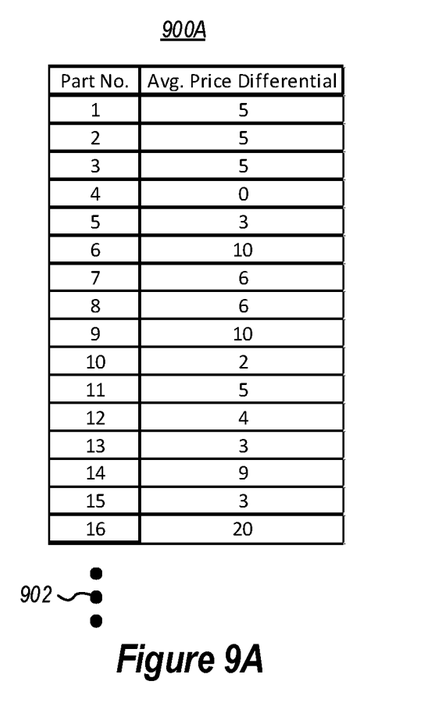
FIGS. 9A and 9B illustrate an exemplary data set that is used to create a final result in response to a request to distributedly join two data sets.
Figure 9B:
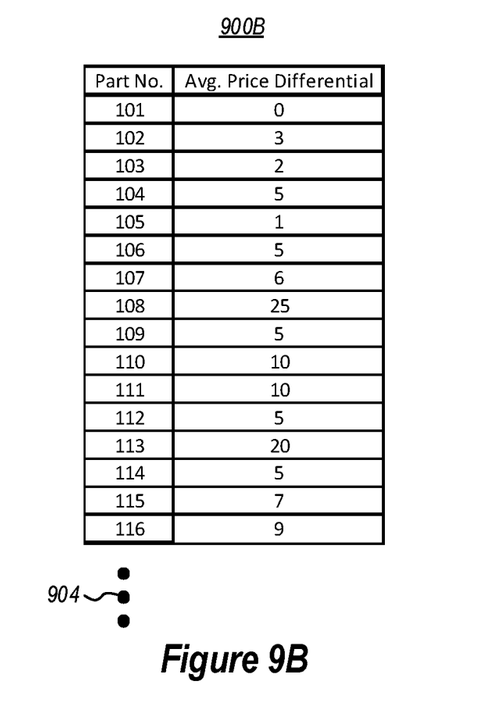

For example, as shown in FIGS. 9A and 9B, a response data set may be created that includes each part number and the average price differential of list price versus sale price for each part number purchased, as originally requested. Notably, as discussed throughout, these operations of shuffling, determining an average, and so forth, may be performed in a distributed manner by a combination of the head node 210 and the worker nodes 212, at least in part because of the large size of the manipulated data sets. Furthermore, as shown, the response data set comprise unique part number and average price differential pairs. Notably, the response data set of FIGS. 9A and 9B is once again shown as two shards of data (i.e., data shard 900A and data shard 900B) for purposes of consistency of the data sets and Figures, as well as to show that the final manipulations (i.e., shuffling on the part number key, performing substractions, performing averages, and so forth) may also be performed in a distributed manner by a combination of the head node 210 and the worker nodes 212.

In some embodiments, the larger of the two data sets (e.g., the line item data set of FIGS. 5A and 5B) may comprise a fact data set, while the smaller of the two data sets (e.g., the part data set of FIGS. 4A and 4B) may comprise a dimension data set. A fact data set may comprise a data set that continuously captures data such as measurements, metrics, logs, and so forth. Fact data sets may also include candidate keys that comprise each key included within corresponding dimension data sets. As such, dimension data sets may comprise one of numerous data sets that each correspond a particular fact data set, and each include at least one key that is also included in the corresponding fact data set. In other embodiments, both the larger and the smaller data set may both comprise fact data sets. In yet other embodiments, both the larger and the smaller data set may both comprise dimension data sets. Furthermore, in some embodiments, the larger data set may comprise a data set of at least five terabytes, at least ten terabytes, at least 50 terabytes, at least 80 terabytes, at least 100 terabytes, and so forth. Similarly, in some embodiments, the smaller data set may comprise a data set of at least 500 gigabytes, at least one terabyte, at least two terabytes, and so forth.

While a line item data set and a parts data set were used in the example described with respect to FIGS. 4A through 9B, two such data sets that include essentially any type of data may be used to practice the principles described herein. The principles described herein may be particularly relevant to very large data sets, as described herein. For instance, the principles described herein may be practiced particularly in circumstances where a join operation is to be performed in a distributed manner (e.g., the data sets to be operated upon are stored and/or operated upon in a distributed manner by the distributed data set computer system 300), at least partially because of the size of the data sets involved. Furthermore, while the example described with respect to FIGS. 4A through 9B included an aggregation (or operation) of averaging the difference between particular data within the applicable data sets, any applicable aggregations may be used in conjunction with the principles described herein. For instance, a user may request a sum, minimum, maximum, count, average, median, and so forth.

Figure 10:
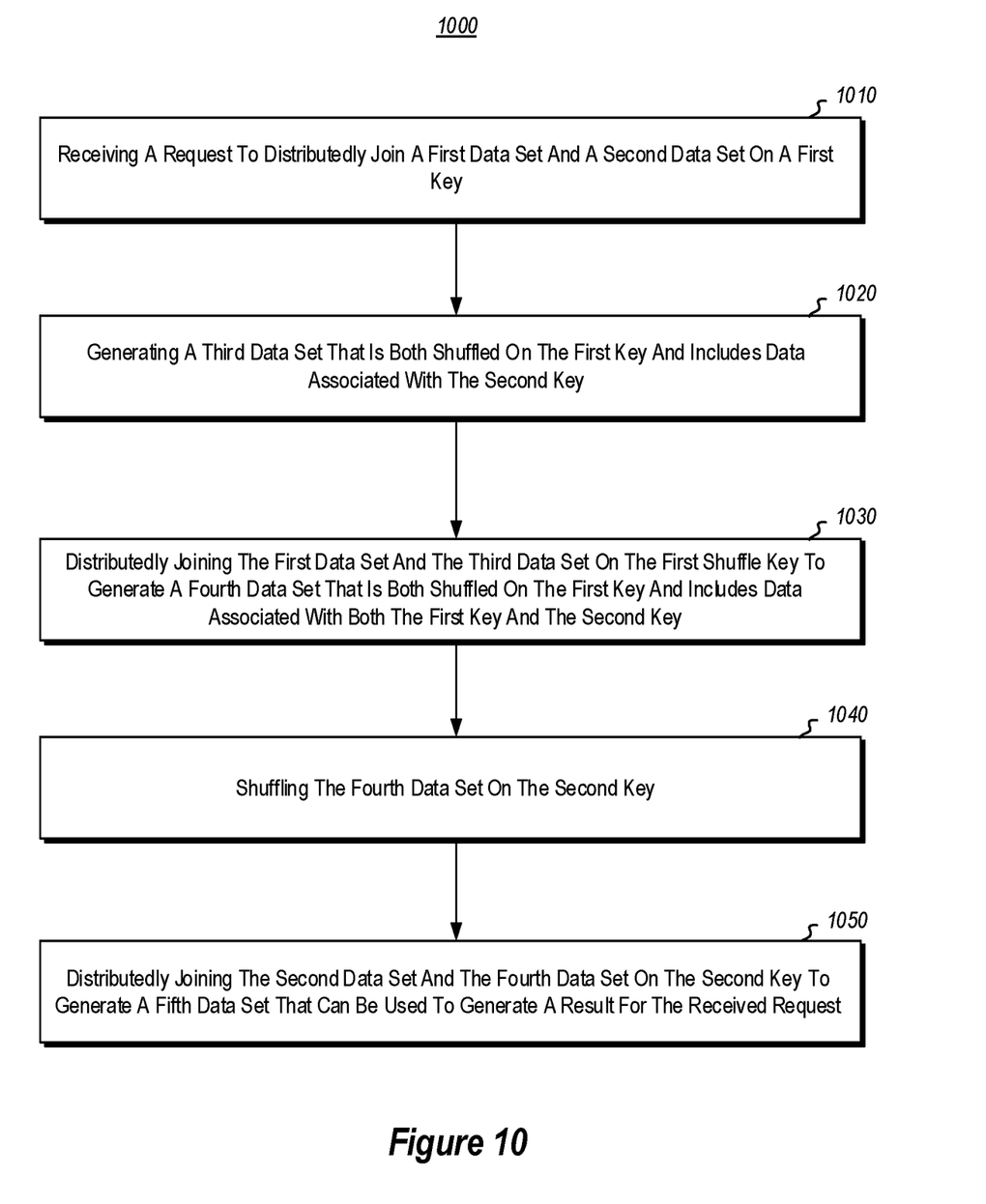
FIG. 10 illustrates a flowchart of a method for distributedly joining two data sets.

FIG. 10 illustrates a method 1000 for distributedly joining two large data sets on a key of the smaller of the two data sets (i.e., the two data sets are each shuffled on a different key). The method 1000 is described with frequent reference to FIGS. 2 through 9B. The method 1000 may begin upon receiving a request to distributedly join a first data set and a second data set on a first key (Act 1010). The first data set is shuffled on the first key and the second data set is shuffled on a second key. Additionally, the second data set may generally comprise a data set that is larger than the first data set. For instance, the part data set of FIGS. 4A and 4B may be the first data set, which is shuffled on a first key of part numbers. The second data set may comprise the line item data set of FIGS. 5A and 5B, which is bigger than the part data set and is shuffled on the order number key.

The method 1000 may also include generating a third data set that is both shuffled on the first key and includes data associated with the second key (Act 1020). For example, the internal data set of FIGS. 6A and 6B is shuffled on the part number key (i.e., the first key) and includes order number data, which corresponds to the second key. The method 1000 may further include distributedly joining the first data set and the third data set on the first shuffle key to generate a fourth data set that is both shuffled on the first key and includes data associated with both the first key and the second key (Act 1030).

For instance, the resulting data set of FIGS. 7A and 7B may comprise a data set that is the result of distributedly joining the part data set of FIGS. 4A and 4B and the internal data set of FIGS. 6A and 6B. Additionally, the resulting data set is shuffled on the first key (i.e., part number) and includes at least part number data, as well as order number data. However, generally, the resulting data set will also include at least one more data type that will be used to build a response to the initial query/request and that is included in the smaller data set (e.g., the parts data set of FIGS. 4A and 4B), while not being included in the larger data set (e.g., the line item data set of FIGS. 5A and 5B). For instance, in the example used throughout, such data comprised the list price data (as shown in FIGS. 7A and 7B), which can be used to determine the average price differential, as requested in the initial query.

The method 1000 may also include shuffling the fourth data set on the second key (1040). For instance, the resulting data set of FIGS. 7A and 7B is shown after it has been shuffled on the second key (i.e., the order number key). The method 1000 may further include distributedly joining the second data set and the fourth data set on the second key to generate a fifth data set that can be used to generate a result for the received request (Act 1050). For example, the final data set of FIGS. 8A and 8B illustrates a fifth data set that is the result of distributedly joining the second data set (e.g., the line item data set of FIGS. 5A and 5B) and the fourth data set (e.g., the resulting data set of FIGS. 7A and 7B). As illustrated in FIGS. 8A and 8B, the final table of the distributed joining of the second data set (e.g., the line item data set of FIGS. 5A and 5B) and the fourth data set (e.g., the resulting data set of FIGS. 7A and 7B) may also include at least one additional type of data to be used in building a response to the initial query/request that is only included in the second table (i.e., the larger table). In the example throughout, such additional data comprised sale price (as shown in FIGS. 8A and 8B), which can be used to find the average price differential, as requested in the initial query.

In some embodiments, the method may further include shuffling the fifth data set on the original shuffle key (i.e., the part number key), as well as performing an aggregation (e.g., minimum, maximum, average, median, sum, and so forth) of data included within the fifth data set. Such a data set is illustrated as the response data set of FIGS. 9A and 9B (i.e., the data set of FIGS. 9A and 9B is shuffled on the original join key—part number—and demonstrates an aggregation of average price differential of list price versus sale price for each part number purchased).

In this way, a distributed join of two large data sets that is to be performed on the key of the smaller of the two data sets to be distributedly joined, can be performed without having to re-shuffle the larger data set on the key of the smaller data set. Avoiding re-shuffling of the larger data set may be accomplished by generating a third data set that is shuffled on the key of the smaller data set and includes the key of the larger data set. The third data set is distributedly joined with the smaller data set to create a fourth data set that can be distributedly joined with larger data set. Performing a distributed join in this way can include great improvements in network traffic, time associated with execution of the distributed join, and resource usage, based at least partially on the avoidance of re-shuffling the larger of the two initial data sets.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
   one or more processors; and
   one or more computer-readable storage media having stored thereon computer-executable instructions that are executable by the one or more processors to cause the computer system to distributedly join two data sets, the computer-executable instructions including instructions that are executable to cause the computer system to perform at least the following:
   receive a request to distributedly join a first data set and a second data set on a first key, wherein the first data set is shuffled on the first key and the second data set is shuffled on a second key, the second data set comprising a data set that is larger than the first data set;
   generate a third data set that is both shuffled on the first key and includes data associated with the second key;
   distributedly join the first data set and the third data set on the first shuffle key to generate a fourth data set that is shuffled on the first key and includes data associated with both the first key and the second key;
   shuffle the fourth data set on the second key; and
   distributedly join the second data set and the fourth data set on the second key to generate a fifth data set that can be used to generate a result for the received request.

2. The computer system in accordance with claim 1, wherein the received request further includes a request to perform an aggregation with respect to data included within the first data set and the second data set.

3. The computer system in accordance with claim 2, wherein the fifth data set is shuffled on the first key.

4. The computer system in accordance with claim 3, wherein the requested aggregation is performed after the fifth data set is shuffled on the first key.

5. The computer system in accordance with claim 4, wherein the requested aggregation comprises performing an average of particular data included within the second data set.

6. The computer system in accordance with claim 1, wherein the first data set comprises a dimension data set.

7. The computer system in accordance with claim 1, wherein the second data set comprises a fact data set.

8. The computer system in accordance with claim 1, wherein the third data set is generated at a runtime of the received request.

9. The computer system in accordance with claim 1, wherein the first data set includes at least two terabytes of data.

10. The computer system in accordance with claim 1, wherein the second data set includes at least 50 terabytes of data.

11. A method, implemented at a computer system that includes one or more processors, for distributedly joining two data sets, comprising:
   receiving a request to distributedly join a first data set and a second data set on a first key, wherein the first data set is shuffled on the first key and the second data set is shuffled on a second key, the second data set comprising a data set that is larger than the first data set;
   generating a third data set that is both shuffled on the first key and includes data associated with the second key;
   distributedly joining the first data set and the third data set on the first shuffle key to generate a fourth data set that is shuffled on the first key and includes data associated with both the first key and the second key;
   shuffling the fourth data set on the second key; and
   distributedly joining the second data set and the fourth data set on the second key to generate a fifth data set that can be used to generate a result for the received request.

12. The method in accordance with claim 11, wherein the received request further includes a request to perform an aggregation with respect to data included within the first data set and the second data set.

13. The method in accordance with claim 12, wherein the fifth data set is shuffled on the first key.

14. The method in accordance with claim 13, wherein the requested aggregation is performed after the fifth data set is shuffled on the first key.

15. The method in accordance with claim 14, wherein the requested aggregation comprises performing an average of particular data included within the second data set.

16. The method in accordance with claim 11, wherein the first data set comprises a dimension data set.

17. The method in accordance with claim 11, wherein the second data set comprises a fact data set.

18. The method in accordance with claim 11, wherein the third data set is generated at a runtime of the received request.

19. The method in accordance with claim 11, wherein the second data set includes at least 80 terabytes of data.

20. A computer program product comprising one or more hardware storage devices having stored thereon computer-executable instructions that are executable by one or more processors of a computer system to distributedly join two data sets, the computer-executable instructions including instructions that are executable to cause the computer system to perform at least the following:
   receive a request to distributedly join a first data set and a second data set on a first key, wherein the first data set is shuffled on the first key and the second data set is shuffled on a second key, the second data set comprising a data set that is larger than the first data set;
   generate a third data set that is both shuffled on the first key and includes data associated with the second key;
   distributedly join the first data set and the third data set on the first shuffle key to generate a fourth data set that is shuffled on the first key and includes data associated with both the first key and the second key;

shuffle the fourth data set on the second key; and
distributedly join the second data set and the fourth data set on the second key to generate a fifth data set that can be used to generate a result for the received request.

\* \* \* \* \*